(12) United States Patent  
Kobayashi et al.

(10) Patent No.: US 7,913,906 B2
(45) Date of Patent: Mar. 29, 2011

(54) READER/WRITER AND MANUFACTURING METHOD THEREOF

(75) Inventors: Tomoki Kobayashi, Nagano (JP); Toshiji Shimada, Nagano (JP); Hiroyuki Kato, Nagano (JP); Hiroshi Shimizu, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 1401 days.

(21) Appl. No.: 11/390,705

(22) Filed: Mar. 28, 2006

(65) Prior Publication Data

US 2006/0231624 A1  Oct. 19, 2006

(30) Foreign Application Priority Data

Apr. 18, 2005  (JP) .................................. 2005-119866

(51) Int. Cl.
*G06K 7/08* (2006.01)
(52) U.S. Cl. .................. 235/451; 428/692.1; 428/693.1; 428/323; 340/572.6
(58) Field of Classification Search .................. 235/439, 235/451

See application file for complete search history.

(56) References Cited

U.S. PATENT DOCUMENTS

| 6,424,315 | B1 * | 7/2002 | Glenn et al. .................. 343/895 |
| 6,552,694 | B1 * | 4/2003 | Fujii et al. ..................... 343/895 |
| 2005/0001026 | A1 | 1/2005 | Maeda et al. | |

FOREIGN PATENT DOCUMENTS

| EP | 1 475 744 A1 | 11/2004 |
| JP | 2004-213217 A | 7/2004 |
| JP | 2004-335999 A | 11/2004 |
| JP | 2005-026743 A | 1/2005 |
| JP | 200512673 | 1/2005 |
| JP | 2005-080023 A | 3/2005 |

OTHER PUBLICATIONS

European Search Report; Application No./Patent No. 06251645.5-2210, Sep. 6, 2008.

* cited by examiner

*Primary Examiner* — Daniel Walsh
*Assistant Examiner* — Tae Kim
(74) *Attorney, Agent, or Firm* — Ladas & Parry LLP

(57) ABSTRACT

A reader/writer comprises a circuit board, a communication control portion mounted on the circuit board and configured to perform communication with IC tags, sealing resin for sealing the communication control portion; and an antenna electrically connected to the communication control portion, in which a resin layer is disposed on the sealing resin, the resin layer having a higher adhesiveness to a conductive film used as the antenna than that of the sealing resin, and the antenna is disposed on the resin layer.

8 Claims, 19 Drawing Sheets

PRIOR ART

READER/WRITER AND MANUFACTURING METHOD THEREOF

BACKGROUND OF THE INVENTION

1. Field of the Invention

The present invention generally relates to a reader/writer for reading and writing information on IC tags and IC cards in a non-contact manner and a manufacturing method thereof.

2. Description of the Related Art

Nowadays, IC tags (also referred to as RFID tags) and IC cards are attached to objects of products and substances (hereafter referred to as objects) for information management. Information about the objects obtained from the IC tags via a reader/writer is managed using a computer in order to improve the efficiency of business.

FIG. 1 is a plan view showing a conventional reader/writer. As shown in FIG. 1, a reader/writer 100 comprises a circuit board 101, a communication control portion 102, a matching circuit portion 103, an antenna 104, and a mold resin 105.

The circuit board 101 includes a conductor pattern such as wiring, vias (neither is shown in the drawings), and the like. The communication control portion 102, the matching circuit portion 103, and the antenna 104 are mounted on the same plane of the circuit board 101. The communication control portion 102 comprises an IC chip, a passive component such as LCR, and the like and the communication control portion 102 is sealed with the mold resin 105. The communication control portion 102 is configured to transmit/receive information with IC tags via the antenna 104 and electrically connected to the matching circuit portion 103.

The matching circuit portion 103 is electrically connected to the antenna 104 and the communication control portion 102. The matching circuit portion 103 is configured to perform matching in accordance with the frequency of electromagnetic waves used for communication and the impedance of input/output.

The antenna 104 is disposed on the circuit board 101 such that the antenna 104 surrounds the communication control portion 102. The antenna 104 is configured to supply IC tags with electric power and transmit/receive information via electromagnetic induction (refer to Patent document 1, for example).

Patent Document 1: Japanese Laid-Open Patent Application No. 2005-12673

However, in the conventional reader/writer 100, the communication control portion 102, the matching circuit portion 103, and the antenna 104 are mounted on the same plane of the circuit board 101, so that the size of the circuit board 101 is increased. This is problematic in that miniaturizing the reader/writer 100 is difficult.

FIG. 2 is a schematic diagram showing the relationship between a magnetic flux generated from an antenna and an eddy current. In FIG. 2, the same components as in the reader/writer 100 shown in FIG. 1 are provided with the same numerical reference.

Further, when the circuit board 101 including the antenna 104 is assumed to be embedded in other device, the circuit board 101 may be disposed on a metallic material 106 (such as other circuit board, a battery, a frame, or the like) due to the restriction of position. In this case, a magnetic flux $B_1$ generated from the antenna 104 collides with the metallic material 106 and an eddy current $I_1$ is generated on a surface of the metallic material 106. Because of the eddy current $I_1$, a new magnetic flux $B_2$ is generated and the magnetic flux $B_1$ is attenuated. This is problematic in that the reliability of communication between IC tags and the reader/writer 100 is reduced.

SUMMARY OF THE INVENTION

The present invention has been made in view of the aforementioned problems.

It is a general object of the present invention to provide an improved and useful reader/writer and a manufacturing method thereof in which the above-mentioned problems are eliminated.

A more specific object of the present invention is to provide a miniaturized reader/writer capable of improving the reliability of communication with IC tags and IC cards, and to provide a manufacturing method thereof.

According to one aspect, the present invention provides a reader/writer comprising: a circuit board; a communication control portion mounted on the circuit board and configured to perform communication with IC tags; sealing resin for sealing the communication control portion; and an antenna electrically connected to the communication control portion, in which a resin layer is disposed on the sealing resin, the resin layer having a higher adhesiveness to a conductive film used as the antenna than that of the sealing resin, and the antenna is disposed on the resin layer.

According to the present invention, the resin layer is disposed on the sealing resin for sealing the communication control portion, the resin layer having a higher adhesiveness to the conductive film used as the antenna than that of the sealing resin. And the antenna is disposed on the resin layer. Thus, it is possible to improve the adhesiveness between the resin layer and the antenna and to reduce the size of the circuit board, thereby miniaturizing the reader/writer.

Further, in the aforementioned structure, resin containing soft magnetic metallic powder may be used as the resin layer. By disposing the resin layer including the resin containing soft magnetic metallic powder between the circuit board and the antenna, it is possible to prevent the generation of an eddy current and improve the reliability of communication between IC tags and the reader/writer.

According to another aspect, the present invention provides a method for manufacturing a reader/writer including a communication control portion for communicating with IC tags, sealing resin for sealing the communication control portion, and an antenna electrically connected to the communication control portion mounted on a circuit board. The method comprises the steps of: mounting the communication control portion on the circuit board; forming the sealing resin; forming a resin layer on the sealing resin, the resin layer having a higher adhesiveness to a conductive film used as the antenna than that of the sealing resin; and forming the antenna on the resin layer.

According to the present invention, the resin layer is formed on the sealing resin having a poor adhesiveness to the conductive film used as the antenna, the resin layer having a higher adhesiveness to the conductive film used as the antenna than that of the sealing resin. Thus, it is possible to form the antenna above the sealing resin.

Moreover, the step of forming other resin layer including resin containing soft magnetic metallic powder may be included between the sealing resin forming step and the resin layer forming step. By forming other resin layer including the resin containing soft magnetic metallic powder between the sealing resin forming step and the resin layer forming step, it is possible to prevent the generation of an eddy current and improve the reliability of communication between IC tags and the reader/writer.

According to the present invention, a reader/writer can be miniaturized and the present invention provides a reader/writer capable of improving the reliability of communication with IC tags and IC cards and a manufacturing method thereof.

DESCRIPTION OF THE PREFERRED EMBODIMENTS

In the following, embodiments of the present invention will be described with reference to the accompanying drawings.

First Embodiment

Figure 1:
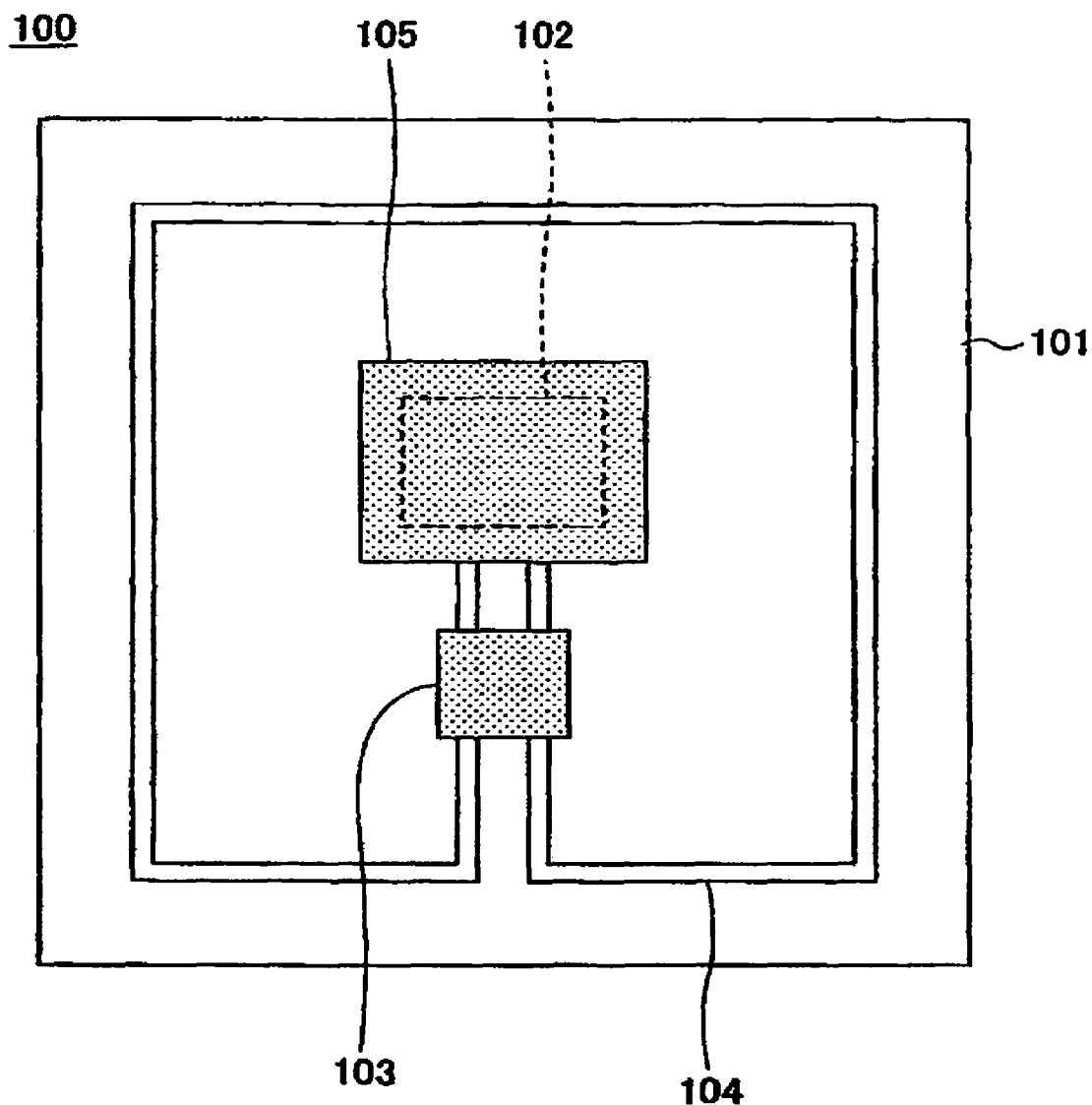
FIG. 1 is a plan view showing a conventional reader/writer.
Figure 2:
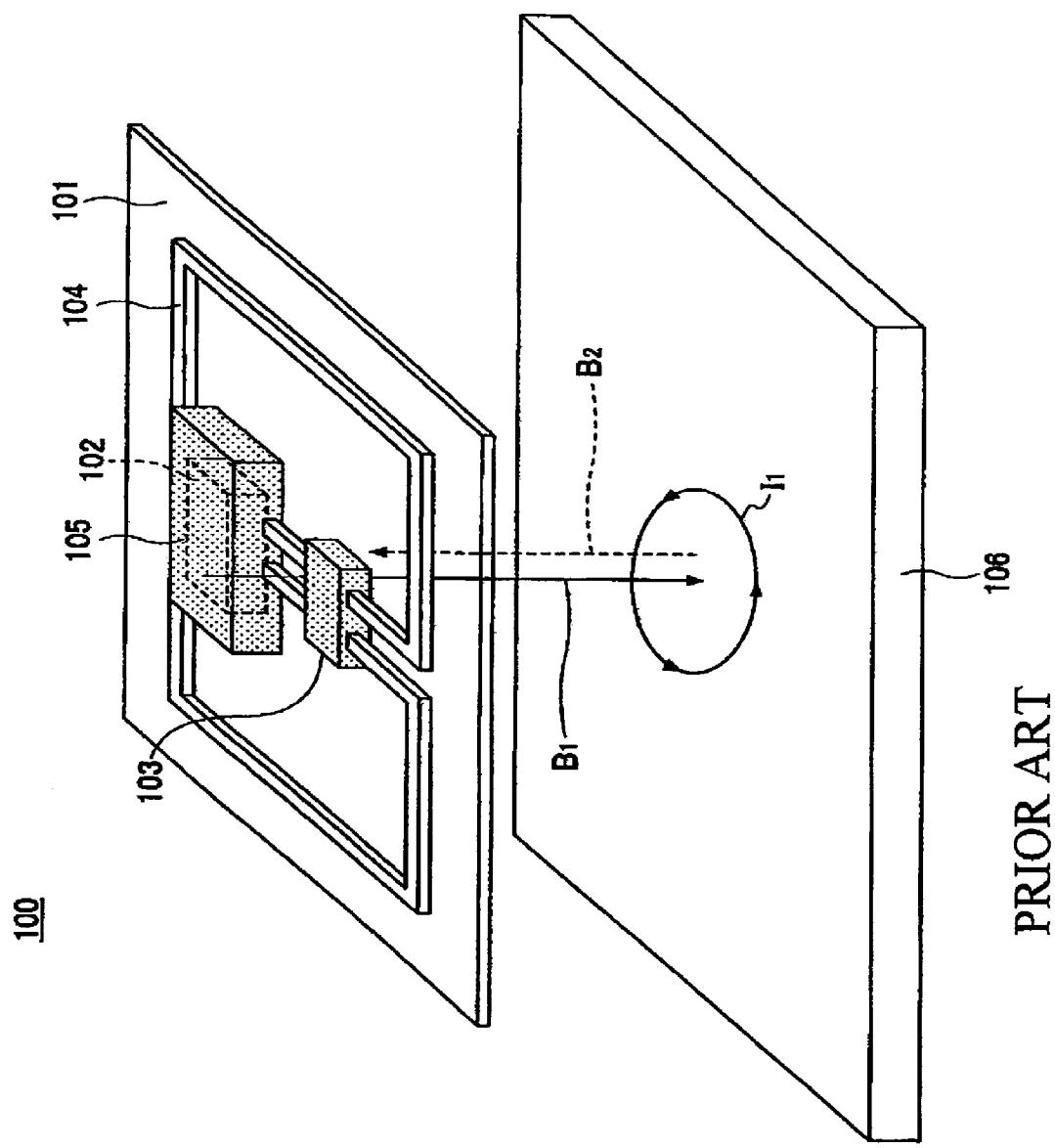
FIG. 2 is a schematic diagram showing a relationship between a magnetic flux generated from an antenna and an eddy current.
Figure 3:
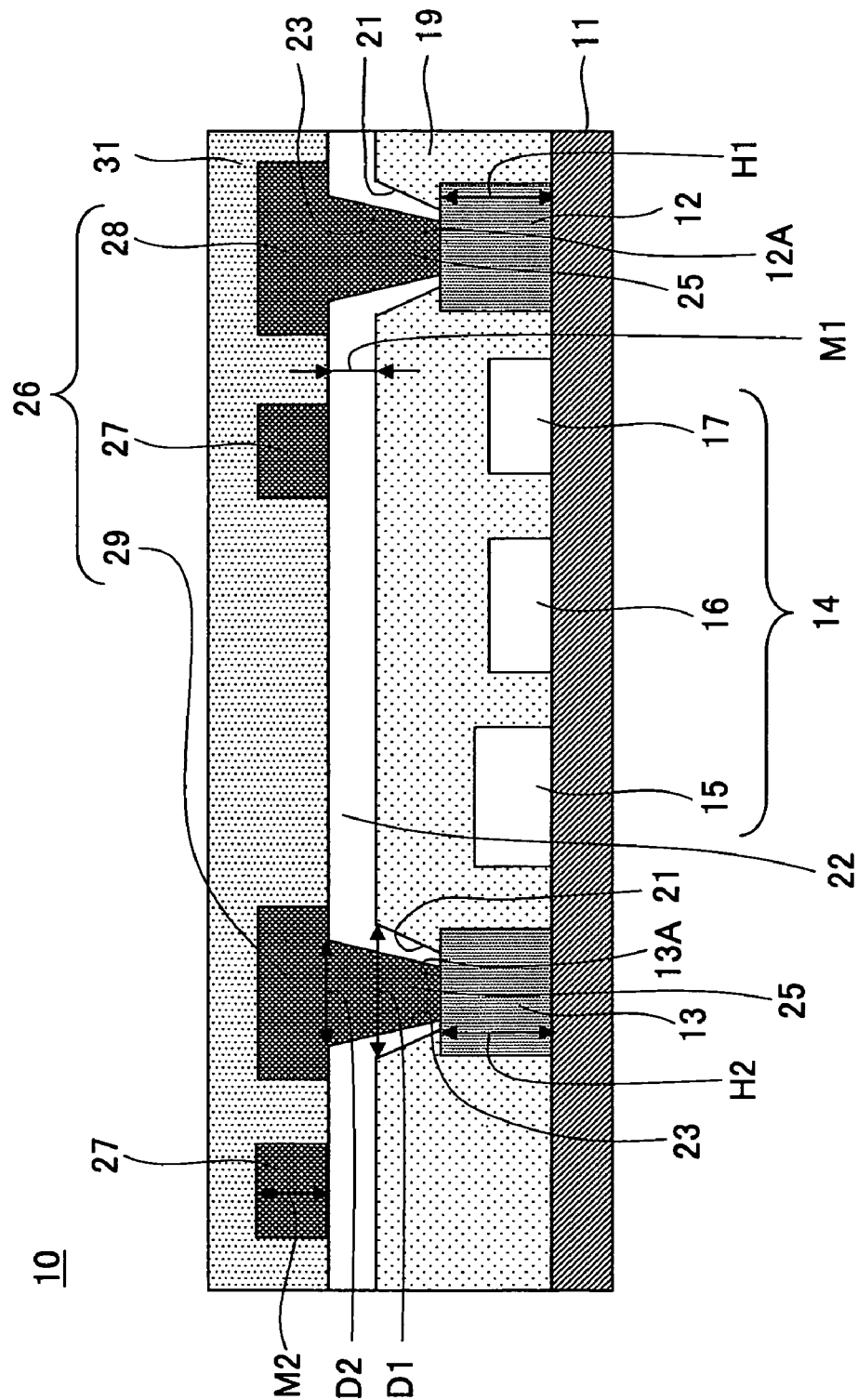
FIG. 3 is a cross-sectional view of a reader/writer according to a first embodiment of the present invention.
Figure 4:
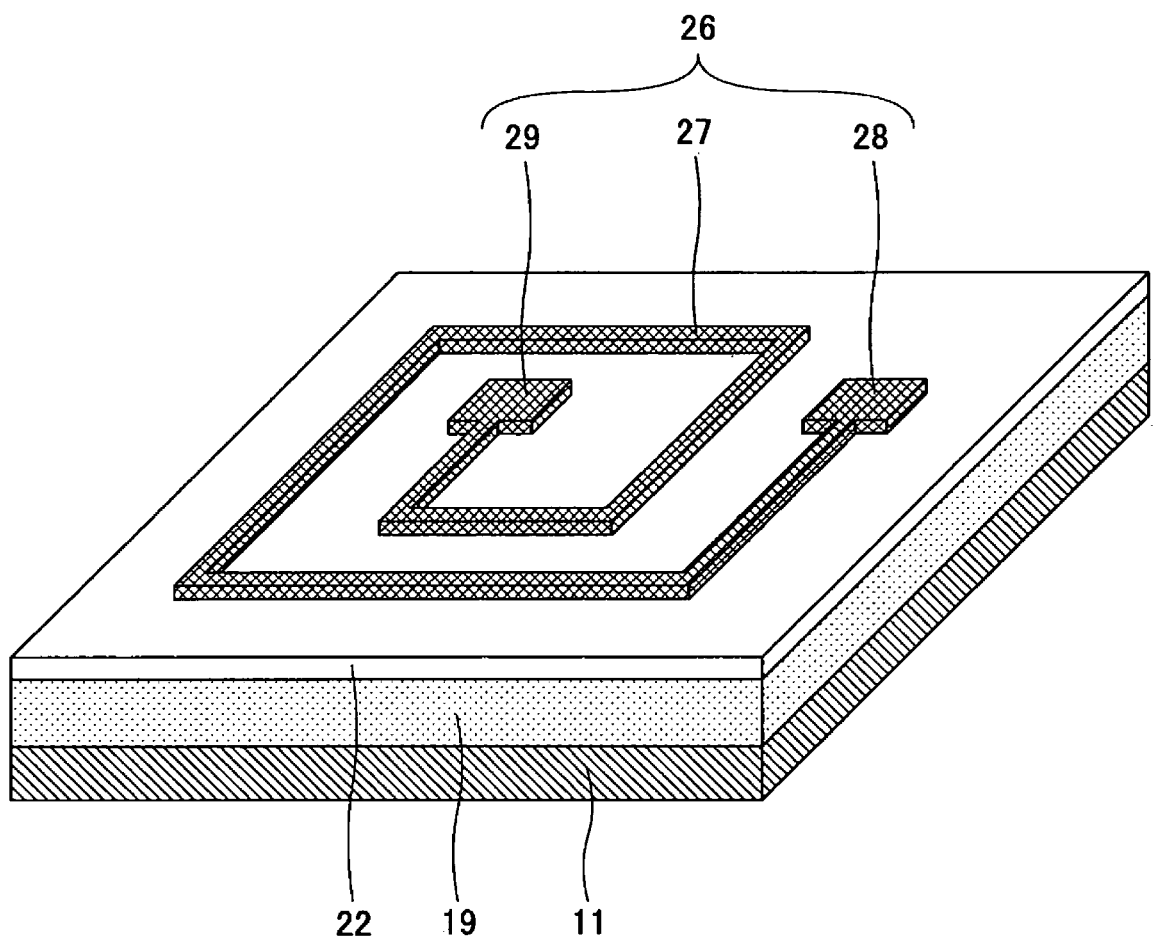
FIG. 4 is a perspective view of the reader/writer shown in FIG. 3.

FIG. 3 is a cross-sectional view of a reader/writer according to a first embodiment of the present invention. FIG. 4 is a perspective view of the reader/writer shown in FIG. 3. In FIG. 4, a solder resist 31 is omitted for ease of understanding the form of an antenna 26.

First, with reference to FIGS. 3 and 4, a reader/writer 10 according to the first embodiment of the present invention is described. The reader/writer 10 comprises a circuit board 11, via connection terminals 12 and 13, a communication control portion 14, sealing resin 19, a resin layer 22, a via 25, the antenna 26, and the solder resist 31.

In the circuit board 11, a conductor pattern (not shown in the drawings) is formed including a plurality of lines of wiring, vias, and the like. The circuit board 11 includes a substrate configured to form the via connection terminals 12 and 13 and to mount the communication control portion 14 thereon. The circuit board 11 may employ a printed board, a flexible board, or the like, for example.

The via connection terminals 12 and 13 are disposed on the circuit board 11 such that they are electrically connected to the communication control portion 14. Upper surfaces 12A and 13A of the via connection terminals 12 and 13 are exposed from the sealing resin 19 and the resin layer 22. The upper surfaces 12A and 13A of the via connection terminals 12 and 13 are electrically connected to the vias 25. Heights H1 and H2 of the via connection terminals 12 and 13 are set such that the positions of the upper surfaces 12A and 13A of the via connection terminals 12 and 13 are higher than that of the communication control portion 14.

The via connection terminals 12 and 13 can be formed by depositing a Cu plated film on the wiring of the circuit board 11 in a columnar manner or by installing a columnar copper material, for example.

The communication control portion 14 is mounted on the circuit board 11. The communication control portion 14 transmits/receives information with IC tags and functions as the reader/writer 10 together with the antenna 26. The communication control portion 14 includes a control circuit portion 15, an RF circuit portion 16, and a matching circuit portion 17. The control circuit portion 15, the RF circuit portion 16, and the matching circuit portion 17 are installed on the circuit board 11, and they comprise a semiconductor chip and a passive element such as LCR connected to the wiring (not shown in the drawings) of the circuit board 11, for example.

The control circuit portion 15 controls the RF circuit portion 16 and performs communication with the IC tags in accordance with a communications protocol. The control circuit portion 15 also functions as an interface between a host computer (not shown in the drawings) and the reader/writer 10.

The RF circuit portion 16 includes a transmission portion for encoding information to be transmitted to the IC tags and modulating carrier waves (electromagnetic waves), an electric power amplifying portion for supplying the IC tags with electric power, and a receiving portion for demodulating information received from the IC tags.

The matching circuit portion 17 is configured to adjust the frequencies of the carrier waves used for communication and the impedance of input/output.

The sealing resin 19 is used to seal the communication control portion 14 and disposed so as to cover the control circuit portion 15, the RF circuit portion 16, and the matching circuit portion 17. In the sealing resin 19, opening portions 21 for exposing the upper surfaces 12A and 13A of the via connection terminals 12 and 13 are formed.

The sealing resin 19 is used to protect the communication control portion 14 from an external impact and the like. The sealing resin 19 has a smooth surface and roughening the surface thereof is difficult. Thus, the sealing resin 19 has a poor adhesiveness to a conductive film formed by a plating method or a sputtering method, so that the conductive film is detached. Accordingly, it is difficult to directly form the conductive film and dispose the antenna 26 on the sealing resin 19. The sealing resin 19 may employ mold resin, for example. The mold resin generally includes much filler component (not less than 70 wt %). Thus, even when a roughening process is conducted so as to have adhesiveness to plating, the filler is dropped off (collapsed) and an adhesive structure cannot be maintained. In this case, when the plating is applied on the mold resin, the peel strength is as low as 20 to 60 g/cm (the plating is readily peeled off). The mold resin may employ epoxy mold resin formed by a transfer molding method. The epoxy mold resin includes general epoxy resin into which a softener (phenolic novolak resin) and a filler (fused silica, crystalline silica, or the like) are mixed, for example. A diameter D1 of an upper end of the opening portion 21 may be 30 μm to 500 μm, for example.

The resin layer 22 has a higher adhesiveness to the conductive film to be used as the antenna 26 than that of the sealing resin 19. Also, the resin layer 22 is capable of roughening and disposed so as to cover an upper surface of the sealing resin 19. By stacking the resin having a good adhesiveness to plating on the mold resin, when the plating is applied on an upper surface of the resin, the peel strength is not less than 600 g/cm and the adhesiveness to the plating is improved. The resin layer to be stacked on the mold resin may employ epoxy resin, phenolic resin, liquid crystal polymer resin, polyimide resin, or the like. For example, when thermosetting epoxy resin is used as the resin layer, the epoxy resin is sufficiently adhered to the mold resin by thermosetting. In the resin layer 22, opening portions 23 for exposing the upper surfaces 12A and 13A of the via connection terminals 12 and 13 are formed. The resin layer 22 may employ epoxy resin, for example. A thickness M1 of the resin layer 22 may be 20 μm to 60 μm, for example. Further, an opening diameter D2 of an upper end of the opening portion 23 may be 20 μm to 400 μm, for example.

In this manner, by disposing the resin layer 22 on the sealing resin 19, the resin layer 22 having a higher adhesiveness to the conductive film to be used as the antenna 26 than that of the sealing resin 19 and capable of roughening, it is possible to roughen the surface of the resin layer 22 and form the antenna 26 on the resin layer 22. Moreover, it is possible to improve the adhesiveness between the resin layer 22 and the antenna 26.

The resin layer 22 may employ resin such as epoxy resin in which metallic particles such as Pd used as a catalyst for plating are dispersed, for example. This improves the adhesiveness between the conductive film (plated film) disposed on the resin layer 22 and the resin layer 22.

The via 25 is disposed at the opening portion 23 formed on the resin layer 22. A lower end of the via 25 is electrically connected to one of the via connection terminals 12 and 13. An upper end of the via 25 is electrically connected to one of antenna portion connection terminals 28 and 29. The via 25 is used to electrically connect the via connection terminals 12 and 13 to the antenna 26.

The antenna 26 is configured to supply IC tags with electric power and transmit/receive information via electromagnetic induction. The antenna 26 is formed on the resin layer 22.

In this manner, by disposing the antenna 26 on the resin layer 22 disposed on the sealing resin 19, it is possible to reduce the size (area) of the circuit board 11 as compared with the conventional circuit board 101 and miniaturize the reader/writer 10.

The antenna 26 includes an antenna portion 27 and the antenna portion connection terminals 28 and 29. A thickness M2 of the antenna 26 may be 10 μm to 25 μm, for example.

The antenna portion 27 has a spiral shape and one end portion is connected to the antenna portion connection terminal 28 and the other end portion is connected to the antenna portion connection terminal 29. The antenna portion connection terminal 28 is disposed on the resin layer 22 and electrically connected to the via 25 connected to the via connection terminal 12. The antenna portion connection terminal 29 is disposed on the resin layer 22 and electrically connected to the via 25 connected to the via connection terminal 13. The antenna portion connection terminals 28 and 29 electrically connect the antenna portion 27 to the via connection terminals 12 and 13 via the vias 25.

The solder resist 31 is disposed on the resin layer 22 so as to cover the antenna 26. The solder resist 31 is used to protect the antenna 26 from an external impact and the like.

FIGS. 5 to 15 are diagrams showing steps for manufacturing a reader/writer according to the present embodiment. In FIGS. 5 to 15, the same components as in the reader/writer 10 shown in FIG. 3 are provided with the same numerical reference.

In the following, a method for manufacturing the reader/writer 10 according to the present embodiment is described with reference to FIGS. 5 to 15.

Figure 5:
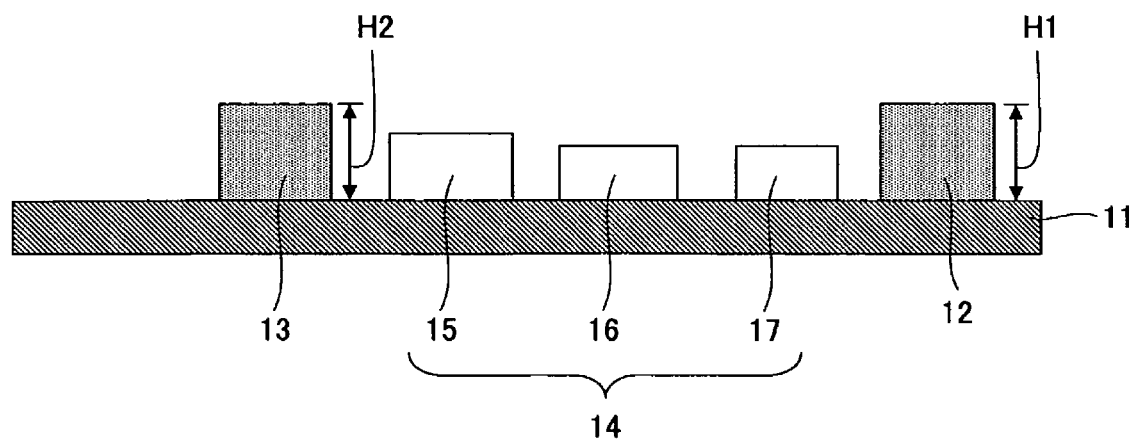
FIG. 5 is a diagram showing a first step of manufacturing a reader/writer according to the first embodiment.

First, as shown in FIG. 5, the via connection terminals 12 and 13 are formed on the circuit board 11, and then the communication control portion 14 (the control circuit portion 15, the RF circuit portion 16, and the matching circuit portion 17) is mounted on one side of the circuit board 11 on which the via connection terminals 12 and 13 are formed (a step of mounting the communication control portion). In this case, the height H2 of the via connection terminal 13 is formed to so as to have substantially the same height as the height H1 of the via connection terminal 12.

The via connection terminals 12 and 13 can be formed by depositing a Cu plated film on the wiring of the circuit board 11 in a columnar manner or by installing a columnar copper material, for example.

Figure 6:
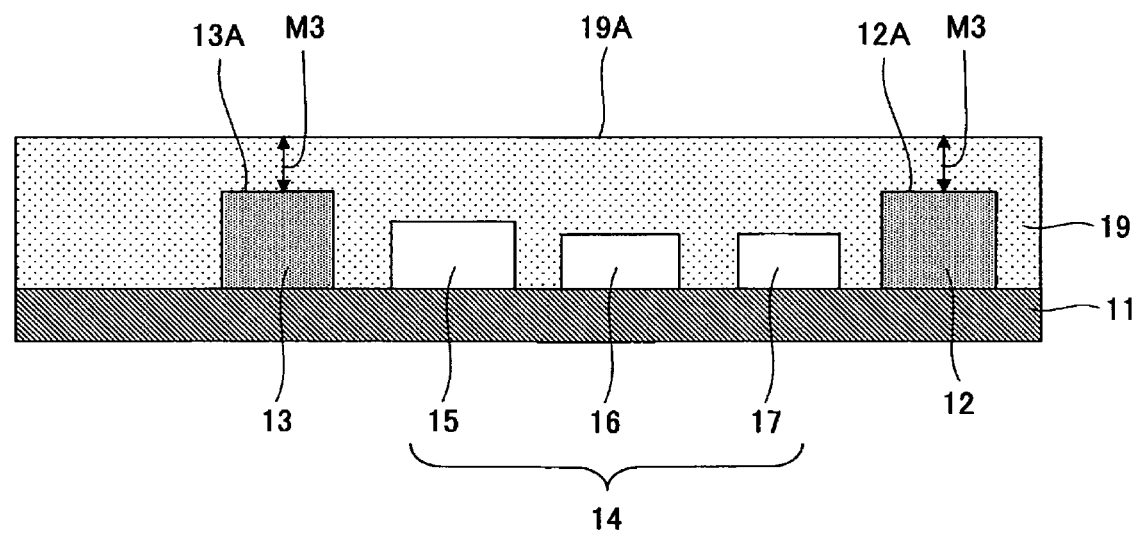
FIG. 6 is a diagram showing a second step of manufacturing a reader/writer according to the first embodiment.

Next, as shown in FIG. 6, the sealing resin 19 is formed so as to cover the via connection terminals 12 and 13 and the communication control portion 14 (a step of forming the sealing resin). A thickness M3 from the upper surfaces 12A and 13A of the via connection terminals 12 and 13 to an upper surface 19A of the sealing resin 19 may be 10 μm to 600 μm, for example.

Figure 7:
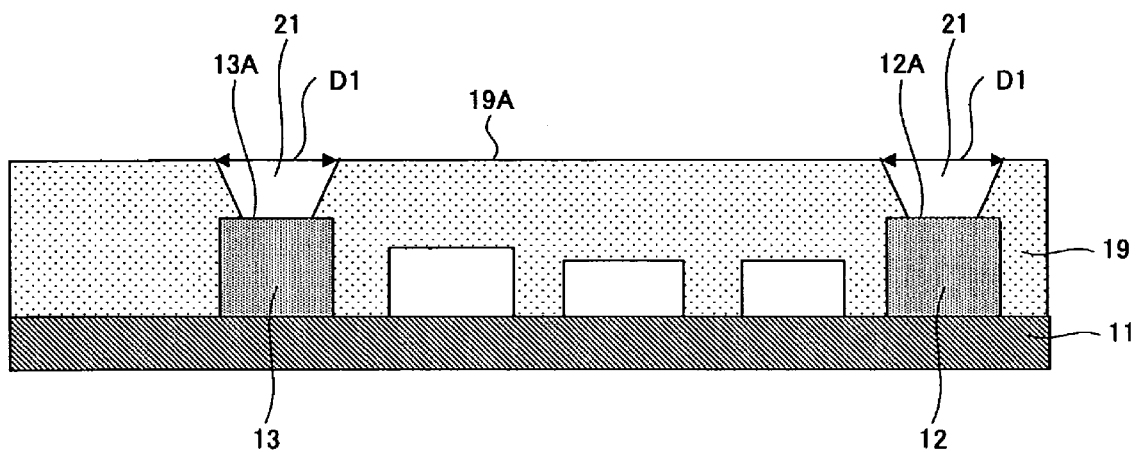
FIG. 7 is a diagram showing a third step of manufacturing a reader/writer according to the first embodiment.

Next, as shown in FIG. 7, the opening portions 21 for exposing the upper surfaces 12A and 13A of the via connection terminals 12 and 13 are formed on the sealing resin 19. The opening portions 21 are formed by laser processing, drill processing, or the like, for example. Further the diameter D1 of the upper end of the opening portion 21 may be 30 μm to 500 μm, for example.

Figure 8:
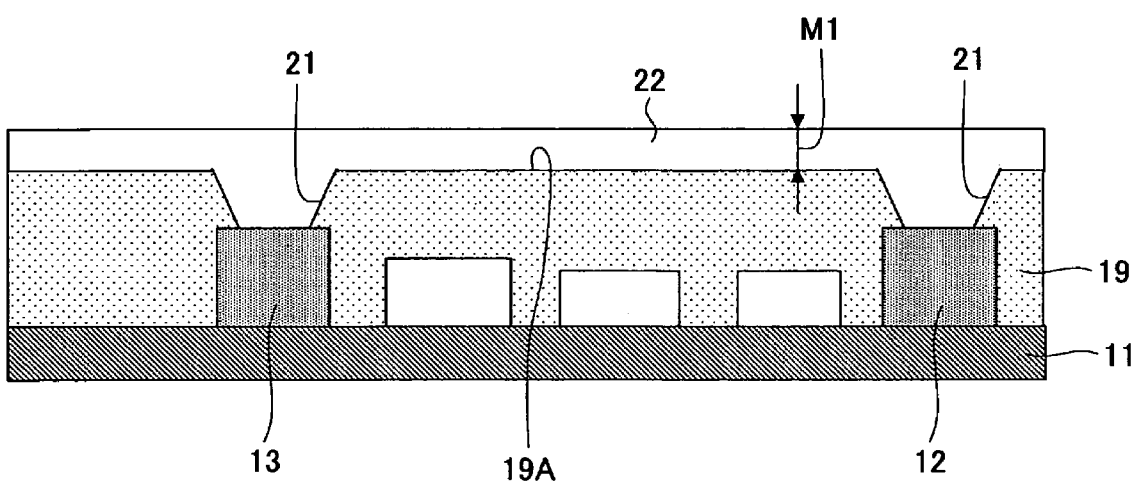
FIG. 8 is a diagram showing a fourth step of manufacturing a reader/writer according to the first embodiment.

Next, as shown in FIG. 8, the resin layer 22 for filling the opening portion 21 and covering the upper surface 19A of the sealing resin 19 is formed (a step of forming the resin layer). The thickness M1 of the resin layer 22 may be 20 μm to 60 μm, for example.

The resin layer 22 may employ epoxy resin, for example. When a resin film is used as the resin layer 22, for example, the resin layer 22 can be pressure-bonded to the sealing resin 19 by heating/applying pressure using a vacuum laminating machine. The resin layer 22 may be formed by coating the sealing resin 19 with liquid resin and then heat-curing the liquid resin. The resin layer 22 may employ resin such as epoxy resin in which metallic particles such as Pd used as a catalyst for plating are dispersed, for example.

Figure 9:
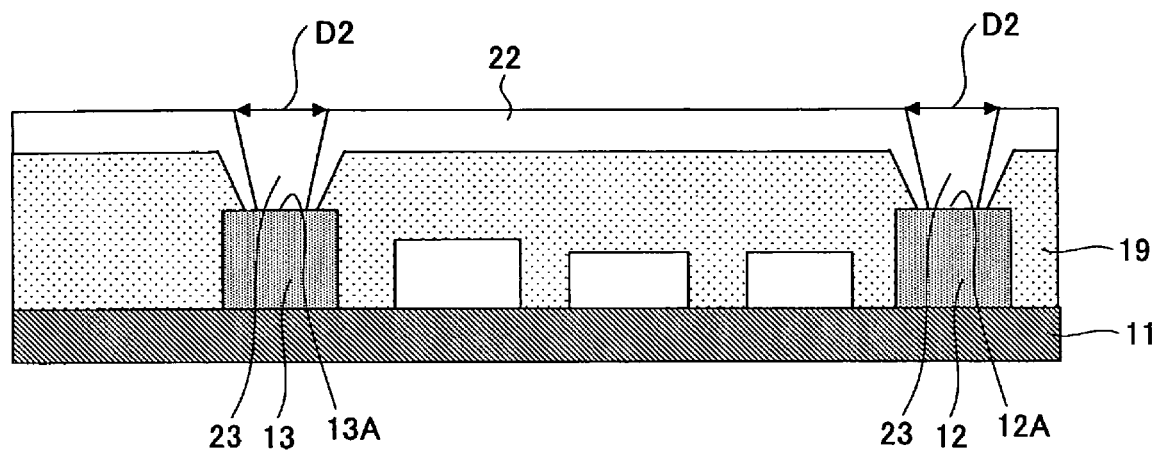
FIG. 9 is a diagram showing a fifth step of manufacturing a reader/writer according to the first embodiment.

Next, as shown in FIG. 9, the opening portions 23 for exposing the upper surfaces 12A and 13A of the via connection terminals 12 and 13 are formed on the resin layer 22. Thereafter, the surface of the resin layer 22 is roughened through a desmear process. The opening portions 23 are formed by laser processing, drill processing, or the like, for example. The opening diameter D2 of the upper end of the opening portion 23, may be 20 μm to 400 μm, for example.

In this manner, the resin layer 22 having a higher adhesiveness to the conductive film than that of the sealing resin 19 is formed on the sealing resin 19 difficult to be roughened because of the smooth surface thereof and having a poor adhesiveness to the conductive film formed by a plating method, a sputtering method or the like. Thus, it is possible to roughen the resin layer 22 and form the antenna 26 on the resin layer 22.

Figure 10:
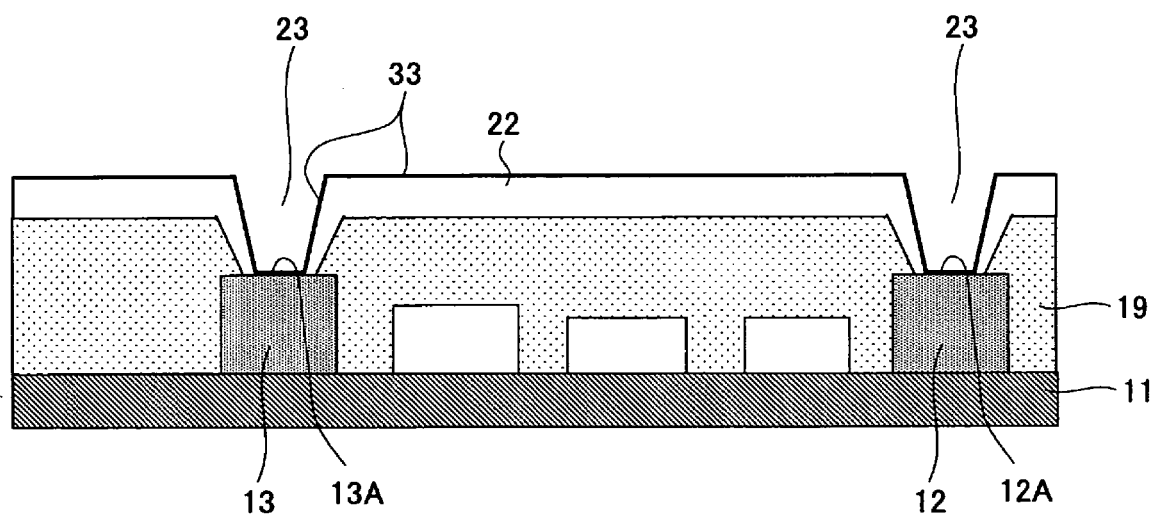
FIG. 10 is a diagram showing a sixth step of manufacturing a reader/writer according to the first embodiment.

Next, as shown in FIG. 10, a seed layer 33 is formed on the resin layer 22 and on the upper surfaces 12A and 13A of the via connection terminals 12 and 13 exposed at the opening portions 23. The seed layer 33 may employ a Cu layer formed by an electroless plating method, for example.

Figure 11:
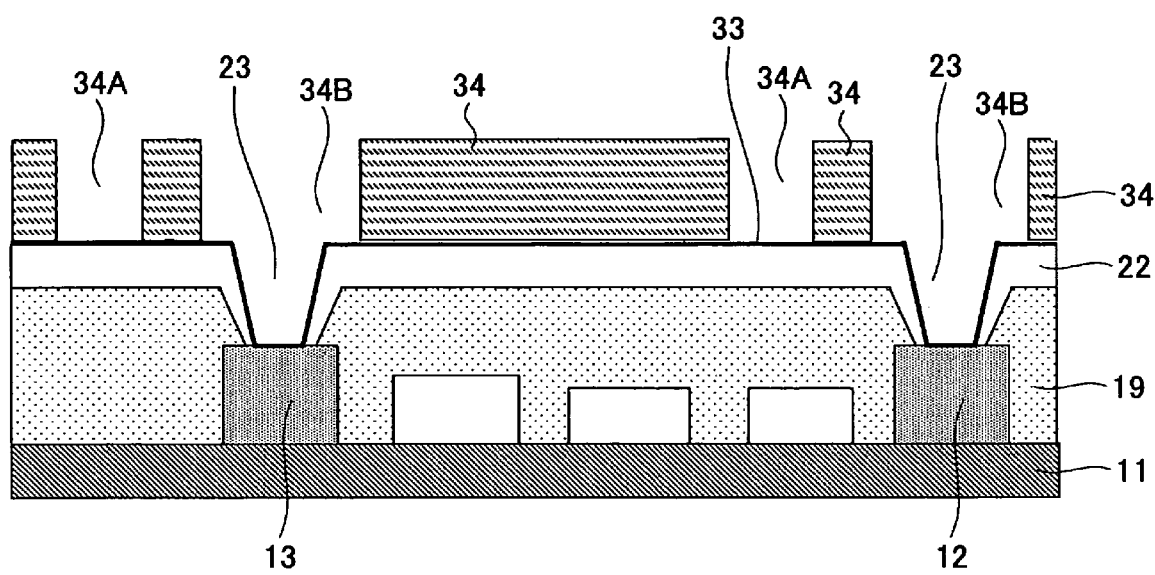
FIG. 11 is a diagram showing a seventh step of manufacturing a reader/writer according to the first embodiment.

Next, as shown in FIG. 11, a resist layer 34 including opening portions 34A and 34B is formed on the seed layer 33. The opening portions 34A correspond to areas where the antenna portion 27 is formed and the opening portions 34B correspond to areas where the antenna portion connection terminals 28 and 29 are formed.

Figure 12:
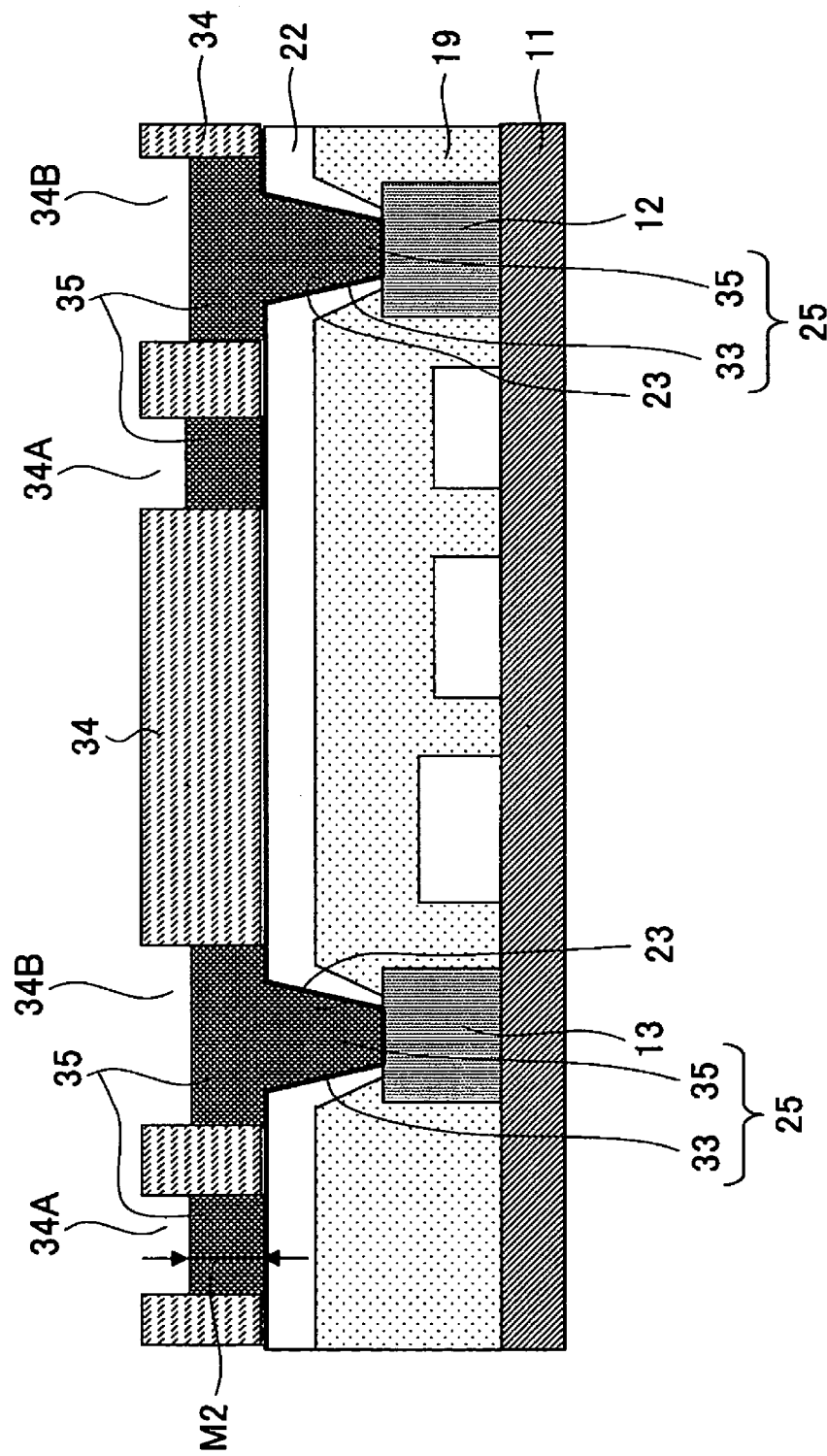
FIG. 12 is a diagram showing an eighth step of manufacturing a reader/writer according to the first embodiment.

Next, as shown in FIG. 12, a conductive metallic film 35 is formed on the seed layer 33 exposed at the opening portions 34A and 34B. Accordingly, the via 25 including the seed layer 33 and the conductive metallic film 35 is formed at the opening portions 23. The conductive metallic film 35 may employ a Cu film formed by an electrolytic plating method, for example. The thickness M2 of the conductive metallic film 35 may be 10 μm to 25 μm, for example.

Figure 13:
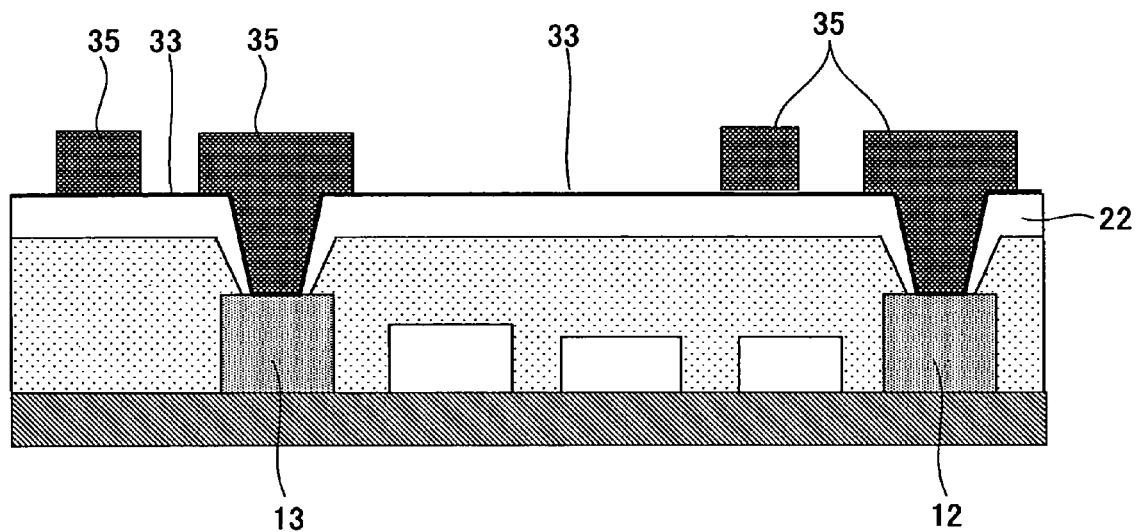
FIG. 13 is a diagram showing a ninth step of manufacturing a reader/writer according to the first embodiment.
Figure 14:
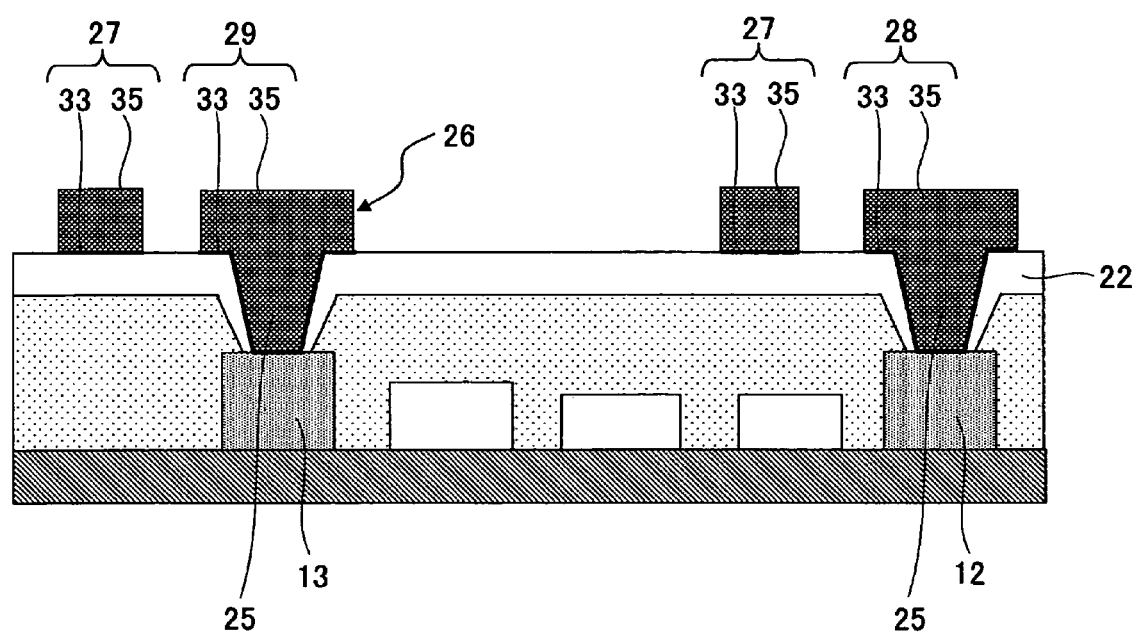
FIG. 14 is a diagram showing a tenth step of manufacturing a reader/writer according to the first embodiment.

Next, as shown in FIG. 13, the resist layer 34 is removed using a resist releasing agent. Then, as shown in FIG. 14, the seed layer 33 is removed from a portion where the conductive metallic film 35 is not formed, thereby forming the antenna 26 (the antenna portion 27 and the antenna portion connection terminals 28 and 29) including the seed layer 33 and the conductive metallic film 35 (a step of forming the antenna).

In this manner, by forming the antenna 26 on the resin layer 22 formed on the sealing resin 19, it is possible to miniaturize the reader/writer 10.

Figure 15:
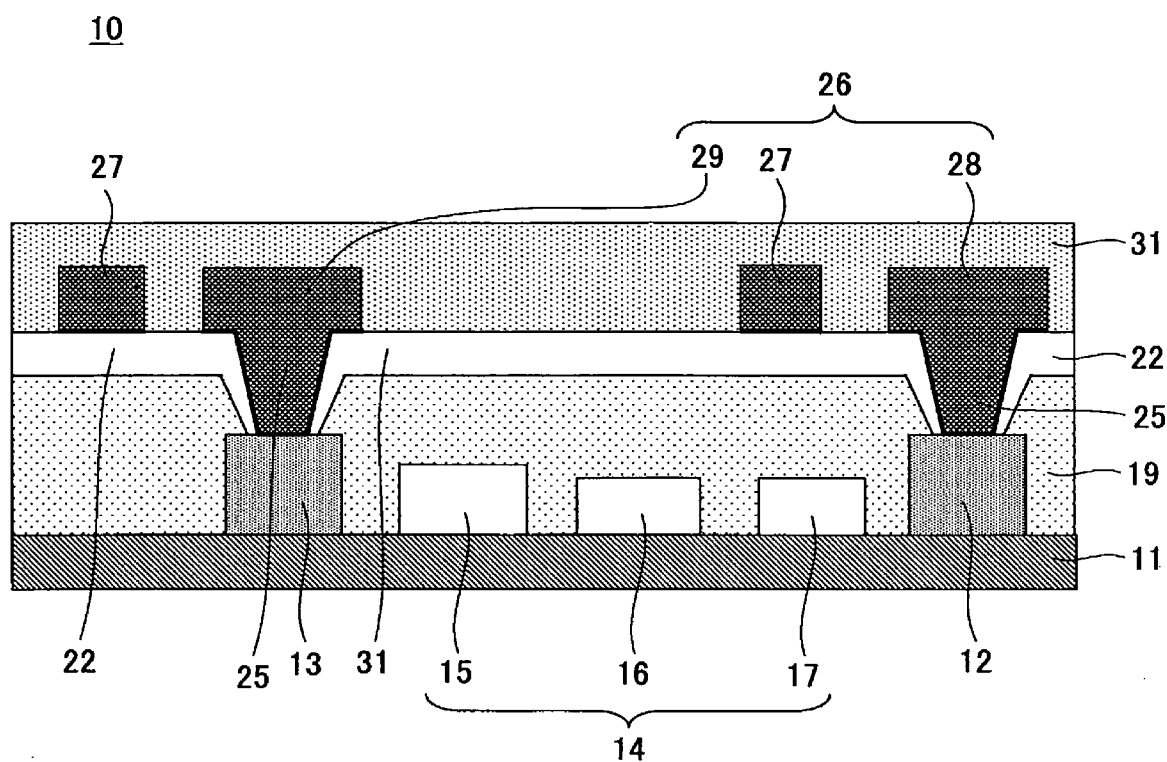
FIG. 15 is a diagram showing an eleventh step of manufacturing a reader/writer according to the first embodiment.

Thereafter, as shown in FIG. 15, by forming the solder resist 31 on the resin layer 22 so as to cover the antenna 26, the reader/writer 10 is manufactured.

As mentioned above, according to the present embodiment, the resin layer 22 having a higher adhesiveness to the conductive film as the antenna 26 than that of the sealing resin 19 is disposed on the sealing resin 19 for sealing the communication control portion 14 and the antenna 26 is disposed on the resin layer 22. Thus, it is possible to reduce the size (area) of the circuit board 11 as compared with the conventional circuit board 101 and miniaturize the reader/writer 10.

In the present embodiment, the method for manufacturing the reader/writer 10 is described based on a case where the antenna 26 is formed by a plating method as an example. However, the antenna 26 may be formed by a vacuum deposition method, a sputtering method, a CVD method, or the like besides the plating method. Moreover, the via 25 may directly be connected to the wiring of the circuit board 11 without disposing the via connection terminals 12 and 13.

Second Embodiment

Figure 16:
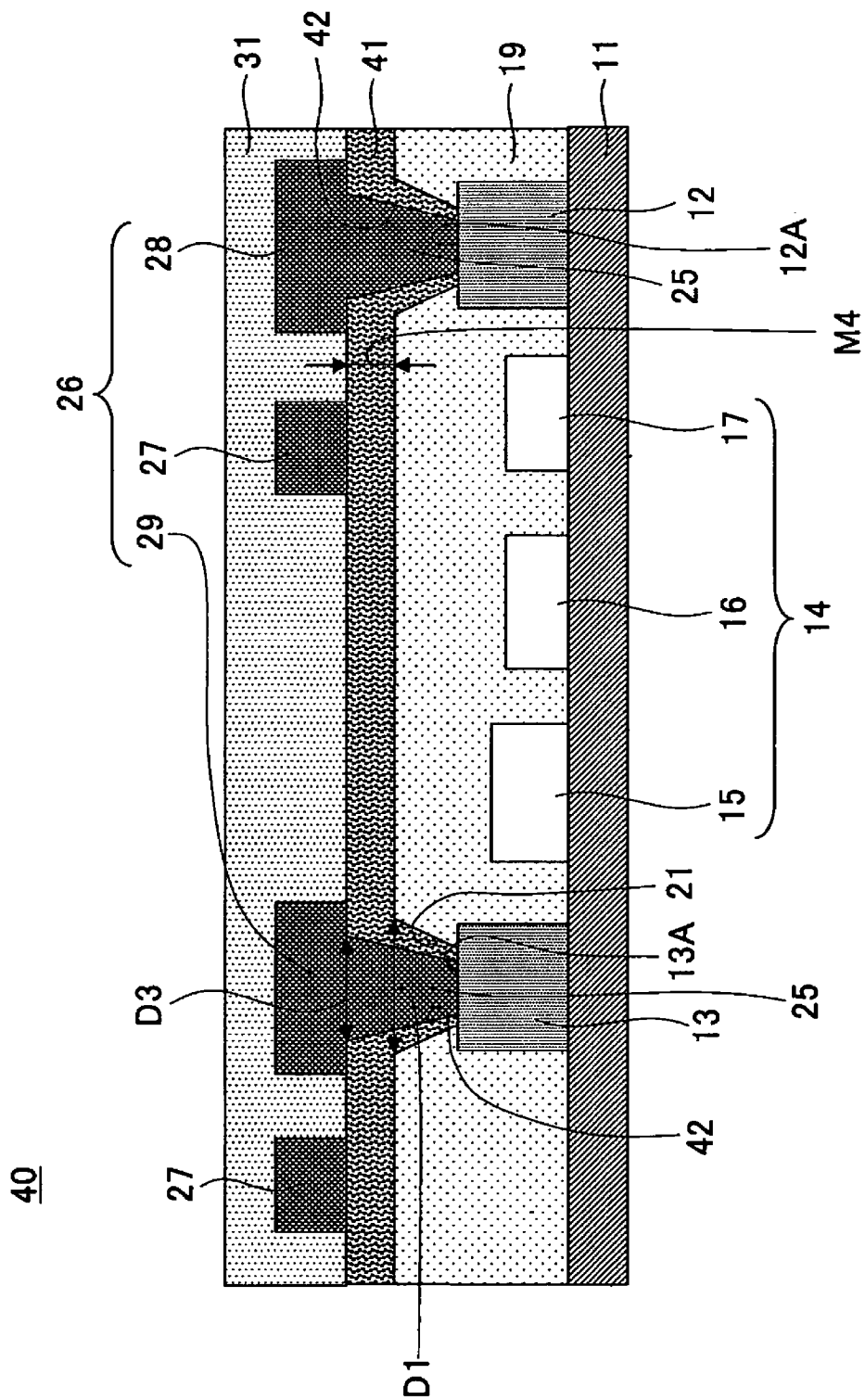
FIG. 16 is a cross-sectional view of a reader/writer according to a second embodiment of the present invention.
Figure 17:
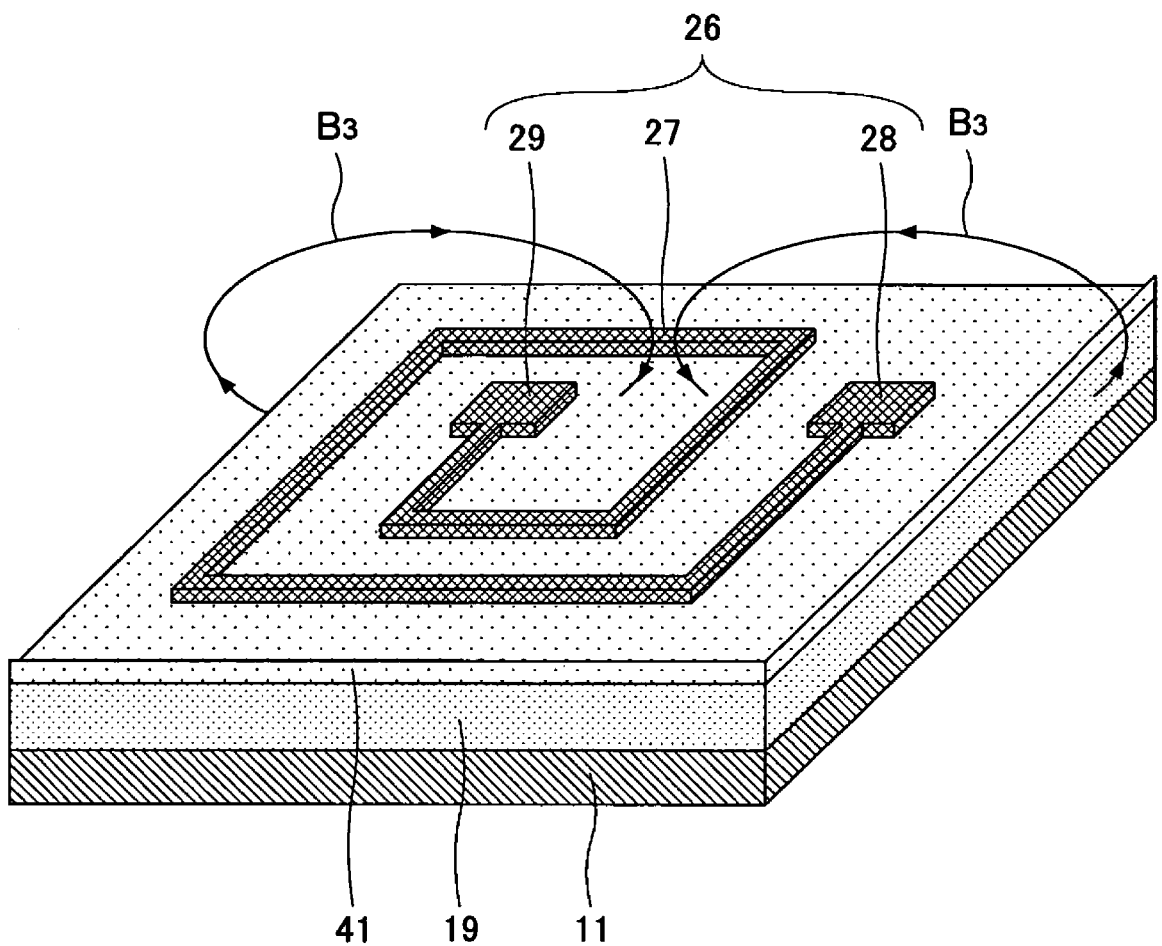
FIG. 17 is a schematic diagram showing a magnetic flux generated from an antenna of a reader/writer according to the second embodiment.

FIG. 16 is a cross-sectional view of a reader/writer according to a second embodiment of the present invention. FIG. 17 is a schematic diagram showing a magnetic flux generated from an antenna of the reader/writer according to the present embodiment. In FIGS. 16 and 17, the same components as in the reader/writer 10 according to the first embodiment are provided with the same numerical reference. In FIG. 17, the solder resist 31 is omitted.

In the following, a reader/writer 40 according to the second embodiment of the present invention is described with reference to FIGS. 16 and 17. The reader/writer 40 includes the circuit board 11, the via connection terminals 12 and 13, the communication control portion 14, the sealing resin 19, a soft magnetic resin layer 41, the via 25, the antenna 26, and the solder resist 31. In other words, the reader/writer 40 has the same structure as in the reader/writer 10 except for the soft magnetic resin layer 41 disposed in place of the resin layer 22 disposed on the reader/writer 10 according to the first embodiment.

The soft magnetic resin layer 41 is disposed between the sealing resin 19 and the antenna 26 so as to cover the upper surface of the sealing resin 19. In the soft magnetic resin layer 41, opening portions 42 for exposing the upper surfaces 12A and 13A of the via connection terminals 12 and 13 are formed. The soft magnetic resin layer 41 includes resin containing soft magnetic metallic powder. The aforementioned resin may employ epoxy resin, for example. The soft magnetic metallic powder may employ a metal with an initial permeability of not less than one. Preferably, the soft magnetic metallic powder includes at least one selected from a group consisting of Al, Cr, Mn, Fe, Co, Ni, B, Si, Sr, Nb, Mo, Mg, Zn, and Pt, for example. Also, the soft magnetic metallic powder may employ metallic powder whose surface is coated with an insulating material such as epoxy resin. Accordingly, it is possible to improve the insulation properties between the via connection terminals 12 and 13 and the antenna 26. A thickness M4 of the soft magnetic resin layer 41 may be 20 μm to 60 μm, for example. An opening diameter D3 of an upper end of the opening portion 42 may be 20 μm to 400 μm, for example.

In this manner, by disposing the soft magnetic resin layer 41 including the resin containing the soft magnetic metallic powder between the antenna 26 and the sealing resin 19, a magnetic flux $B_3$ generated from the antenna 26 does not pass through the circuit board 11. This prevents the generation of an eddy current on the surface of the circuit board 11. Thus, the magnetic flux $B_3$ generated from the antenna 26 is not attenuated, thereby improving the reliability of communication between IC tags and the reader/writer 40.

The soft magnetic metallic powder is preferably mixed with the resin as much as 10 wt % to 70 wt % relative to the resin. When the soft magnetic metallic powder mixed with the resin is less than 10 wt %, the magnetic flux $B_3$ passes through the circuit board 11 and an eddy current is generated, so that the magnetic flux $B_3$ is attenuated. When the soft magnetic metallic powder is more than 70 wt %, the insulation properties of the soft magnetic resin layer 41 cannot be provided sufficiently. Preferably, the soft magnetic metallic powder is mixed with the resin as much as 50 wt % to 70 wt % relative to the resin.

Preferably, an average particle size of the soft magnetic metallic powder is 1 μm to 8 μm. When the average particle size of the soft magnetic metallic powder is less than 1 μm, the magnetic flux $B_3$ passes through the circuit board 11 and an eddy current is generated, so that the magnetic flux $B_3$ is attenuated. When the average particle size of the soft magnetic metallic powder is more than 8 μm, the soft magnetic resin layer 41 becomes fragile.

In addition, when a resin film is used as the soft magnetic resin layer 41, for example, the soft magnetic resin layer 41 can be pressure-bonded to the sealing resin 19 by heating/applying pressure using a vacuum laminating machine. The soft magnetic resin layer 41 may be formed by coating the sealing resin 19 with liquid resin and then heat-curing the liquid resin.

As mentioned above, according to the present embodiment, by disposing the soft magnetic resin layer 41 including the resin containing the soft magnetic metallic powder between the circuit board 11 and the antenna 26, it is possible to prevent the attenuation of the magnetic flux $B_3$ due to an eddy current, the magnetic flux $B_3$ being generated from the antenna 26, and to improve the reliability of communication between IC tags and the reader/writer 40.

The reader/writer 40 according to the present embodiment can be manufactured by the same method as in the reader/writer 10 according to the first embodiment.

Third Embodiment

Figure 18:
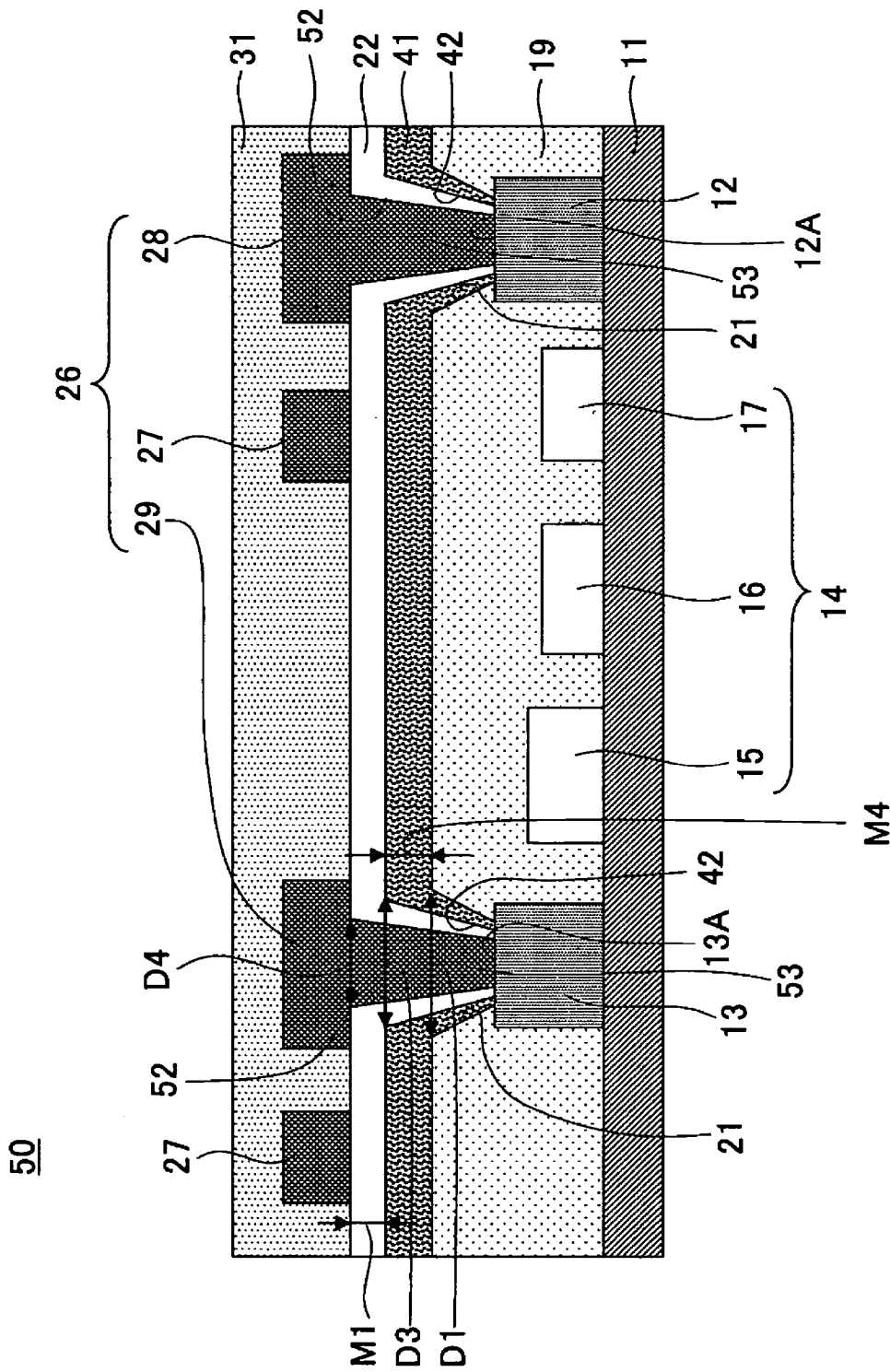
FIG. 18 is a cross-sectional view of a reader/writer according to a third embodiment of the present invention.

FIG. 18 is a cross-sectional view of a reader/writer according to a third embodiment of the present invention. In FIG. 18, the same components as in the reader/writer 40 according to the second embodiment are provided with the same numerical reference.

In the following, a reader/writer 50 according to the third embodiment of the present invention is described with reference to FIG. 18. The reader/writer 50 includes the circuit board 11, the via connection terminals 12 and 13, the communication control portion 14, the sealing resin 19, the resin layer 22, the antenna 26, the solder resist 31, the soft magnetic resin layer 41, and a via 53. In other words, the reader/writer 50 has the structure of the reader/writer 40, in which the resin layer 22 mentioned in the first embodiment is disposed between the sealing resin 19 and the antenna 26 and the via 53 is disposed in place of the via 25. In the present embodiment, the soft magnetic resin layer 41 corresponds to other layer.

In the resin layer 22, opening portions 52 for exposing the upper surfaces 12A and 13A of the via connection terminals 12 and 13 are formed. A diameter D4 of an upper end of the opening portion 52 may be 10 μm to 300 μm, for example.

The via 53 is disposed at the opening portions 52 formed on the resin layer 22. The via 53 is used to electrically connect the antenna 26 to the via connection terminals 12 and 13.

In this manner, by disposing the resin layer 22 between the soft magnetic resin layer 41 and the antenna 26, it is possible to sufficiently insulate between the via connection terminals 12 and 13 and the antenna 26.

FIGS. 19 to 22 are diagrams showing steps for manufacturing a reader/writer according to the present embodiment. In FIGS. 19 to 22, the same components as in the reader/writer 50 shown in FIG. 18 are provided with the same numerical reference.

In the following, a method for manufacturing the reader/writer 50 according to the present embodiment is described with reference to FIGS. 19 to 22.

Figure 19:
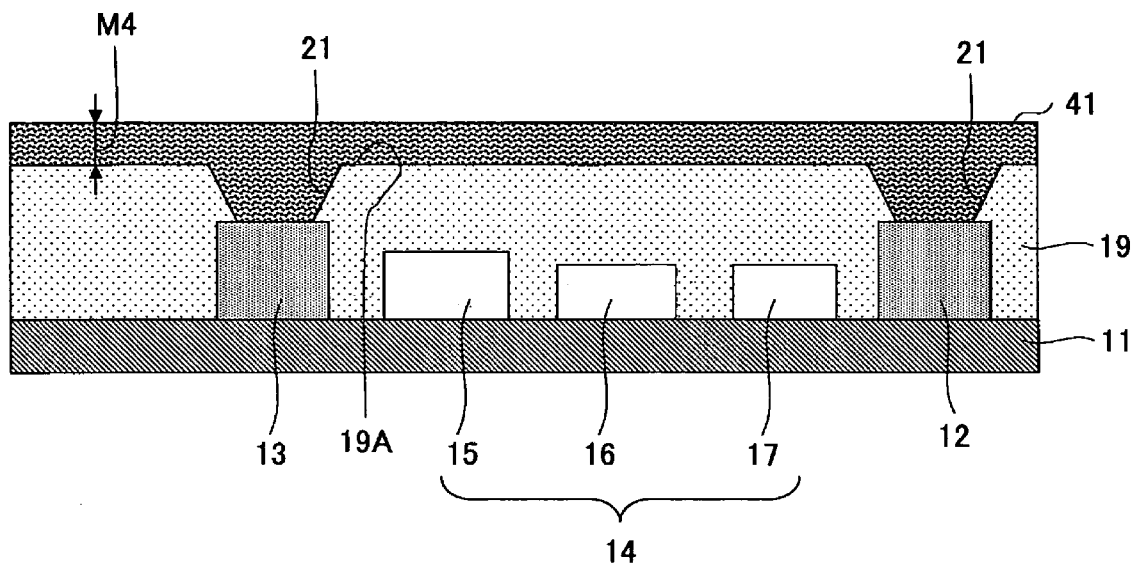
FIG. 19 is a diagram showing a first step of manufacturing a reader/writer according to the third embodiment.

First, the processing (the step of mounting the communication control portion and the step of forming the sealing resin) shown in FIGS. 5 to 7 is performed. Next, as shown in FIG. 19, the soft magnetic resin layer 41 for filling the opening portion 21 and covering the upper surface 19A of the sealing resin 19 is formed (a step of forming other resin layer). The thickness M4 of the soft magnetic resin layer 41 may be 20 μm to 60 μm, for example.

Figure 20:
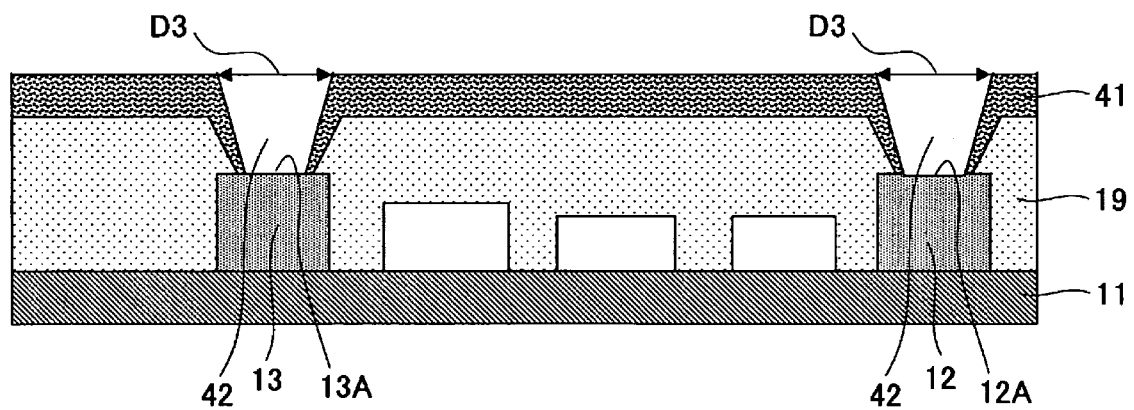
FIG. 20 is a diagram showing a second step of manufacturing a reader/writer according to the third embodiment.

Next, as shown in FIG. 20, the opening portions 42 for exposing the upper surfaces 12A and 13A of the via connection terminals 12 and 13 are formed. The opening portions 42 may be formed by laser processing, drill processing, or the like, for example. The opening diameter D3 of the upper end of the opening portion 42 may be 20 μm to 400 μm, for example.

Figure 21:
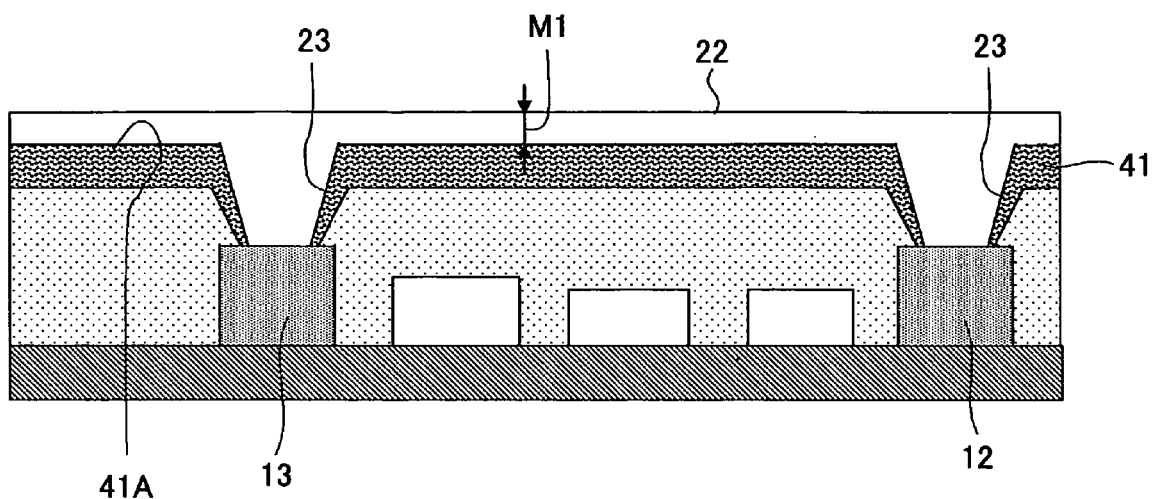
FIG. 21 is a diagram showing a third step of manufacturing a reader/writer according to the third embodiment.

Next, as shown in FIG. 21, the resin layer 22 for filling the opening portion 42 and covering the upper surface 41A of the soft magnetic resin layer 41 is formed (the step of forming the resin layer). The resin layer 22 is capable of roughening through a desmear process or the like.

Figure 22:
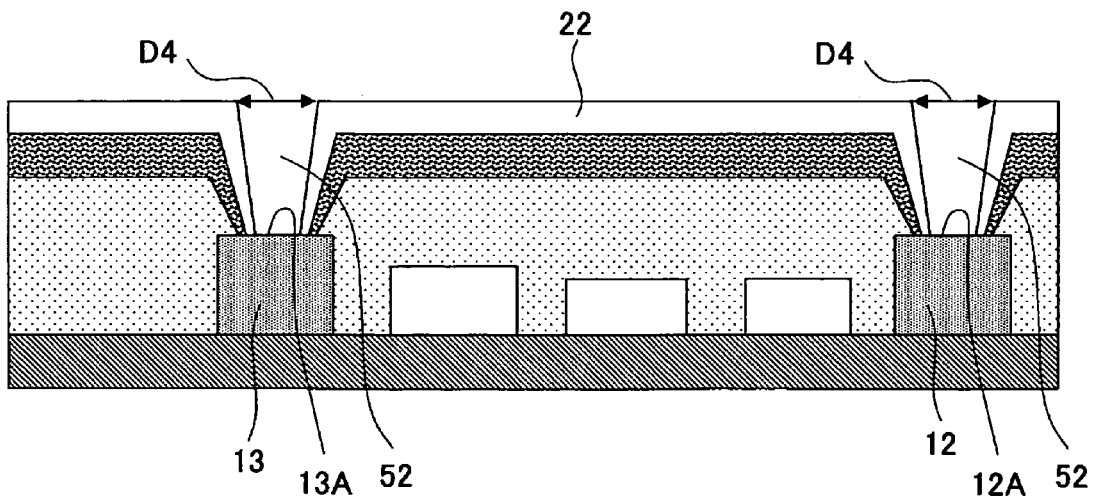
FIG. 22 is a diagram showing a fourth step of manufacturing a reader/writer according to the third embodiment.

Next, as shown in FIG. 22, the opening portions 52 for exposing the upper surfaces 12A and 13A of the via connection terminals 12 and 13 are formed on the resin layer 22. Thereafter, the surface of the resin layer 22 is roughened through the desmear process. The opening portions 52 may be formed by laser processing, drill processing, or the like, for example. The diameter D4 of the upper end of the opening portion 52 may be 10 μm to 300 μm, for example.

Thereafter, by performing the same processing as in the steps shown in FIGS. 10 to 15 described in the first embodiment, the reader/writer 50 is manufactured.

As mentioned above, according to the present embodiment, the reliability of communication between IC tags and the reader/writer 50 is improved using the soft magnetic resin layer 41. And it is possible to sufficiently insulate between the via connection terminals 12 and 13 and the antenna 26 using the resin layer 22 disposed between the soft magnetic resin layer 41 and the antenna 26.

Fourth Embodiment

Figure 23:
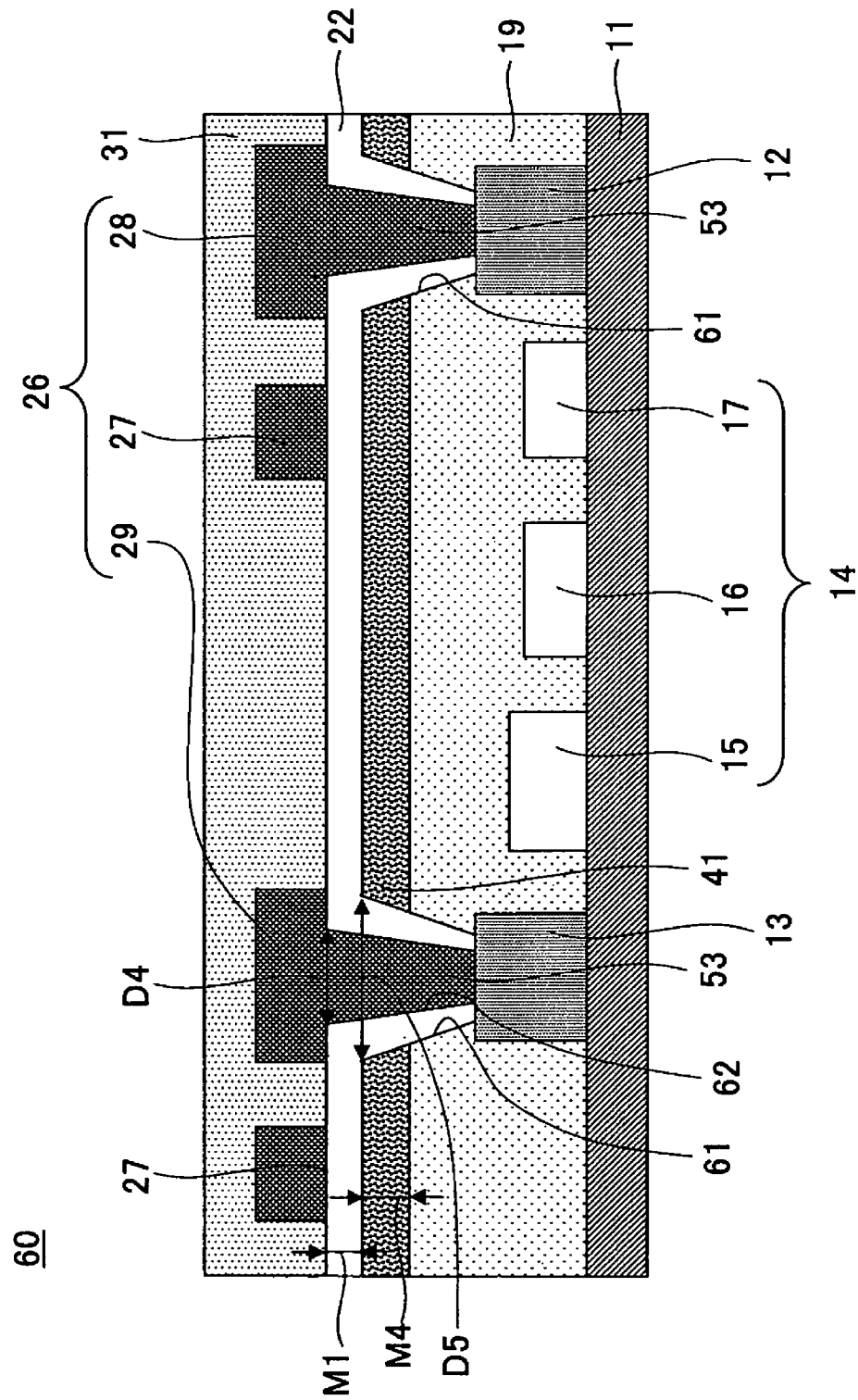
FIG. 23 is a cross-sectional view of a reader/writer according to a fourth embodiment of the present invention.

FIG. 23 is a cross-sectional view of a reader/writer according to a fourth embodiment of the present invention. In FIG. 23, the same components as in the reader/writer 50 according to the third embodiment are provided with the same numerical reference.

In the following, a reader/writer 60 according to the fourth embodiment of the present invention is described with reference to FIG. 23. In the reader/writer 60, the sealing resin 19 and the soft magnetic resin layer 41 are sequentially stacked, and then opening portions 61 for exposing the upper surfaces 12A and 13A of the via connection terminals 12 and 13 are disposed on the sealing resin 19 and the soft magnetic resin layer 41. Except for these elements, the reader/writer 60 has the same structure as that of the reader/writer 50 according to the third embodiment. A diameter D5 of an upper end of the opening portion 61 may be 30 µm to 500 µm, for example.

FIGS. 24 to 27 are diagrams showing steps for manufacturing a reader/writer according to the present embodiment. In FIGS. 24 to 27, the same components as in the reader/writer 60 shown in FIG. 23 are provided with the same numerical reference.

Next, the reader/writer 60 according to the fourth embodiment is described with reference to FIGS. 24 to 27.

Figure 24:
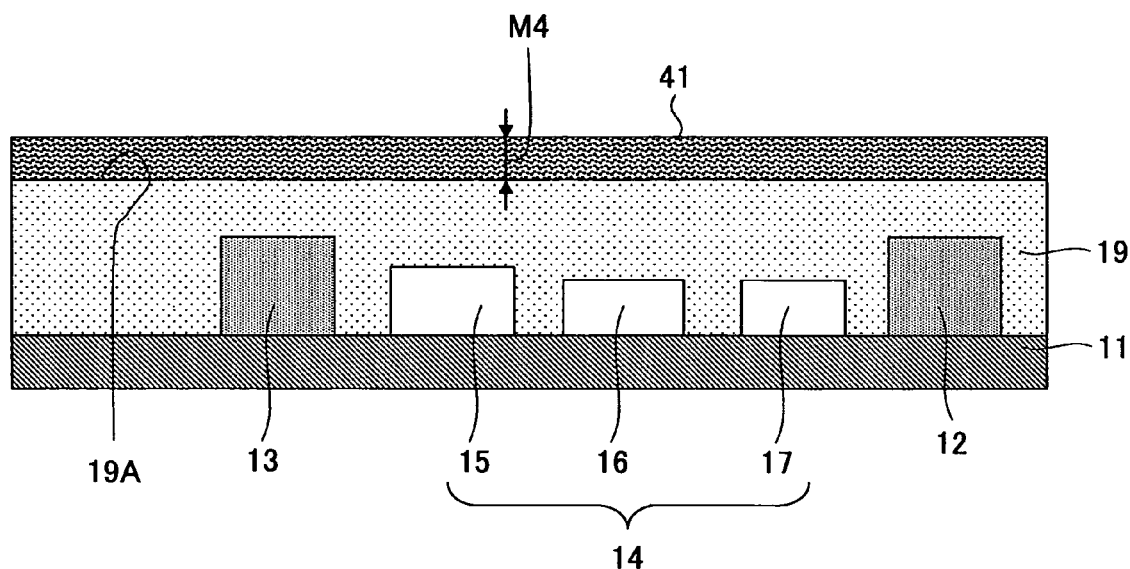
FIG. 24 is a diagram showing a first step of manufacturing a reader/writer according to the fourth embodiment.

First, the steps (the step of mounting the communication control portion and the step of forming the sealing resin) shown in FIGS. 5 and 6 are performed. Next, as shown in FIG. 24, the soft magnetic resin layer 41 is formed so as to cover the upper surface 19A of the sealing resin 19 (a step of forming other resin layer).

Figure 25:
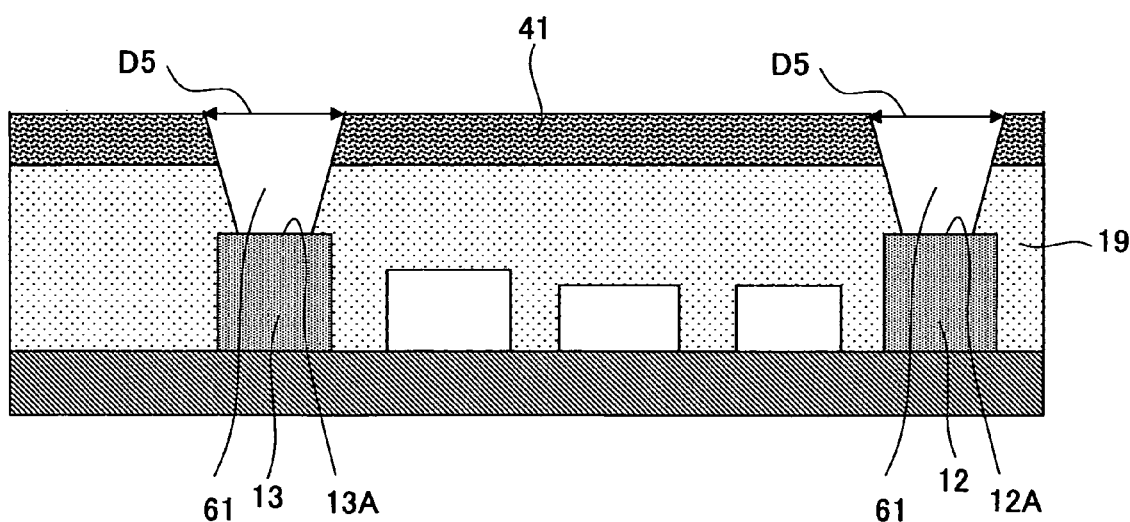
FIG. 25 is a diagram showing a second step of manufacturing a reader/writer according to the fourth embodiment.

Next, as shown in FIG. 25, the opening portions 61 for exposing the upper surfaces 12A and 13A of the via connection terminals 12 and 13 are formed on the sealing resin 19 and the soft magnetic resin layer 41. The opening portions 61 may be formed by laser processing, drill processing, or the like, for example. The diameter D5 of the upper end of the opening portion 61 may be 30 µm to 500 µm, for example.

Figure 26:
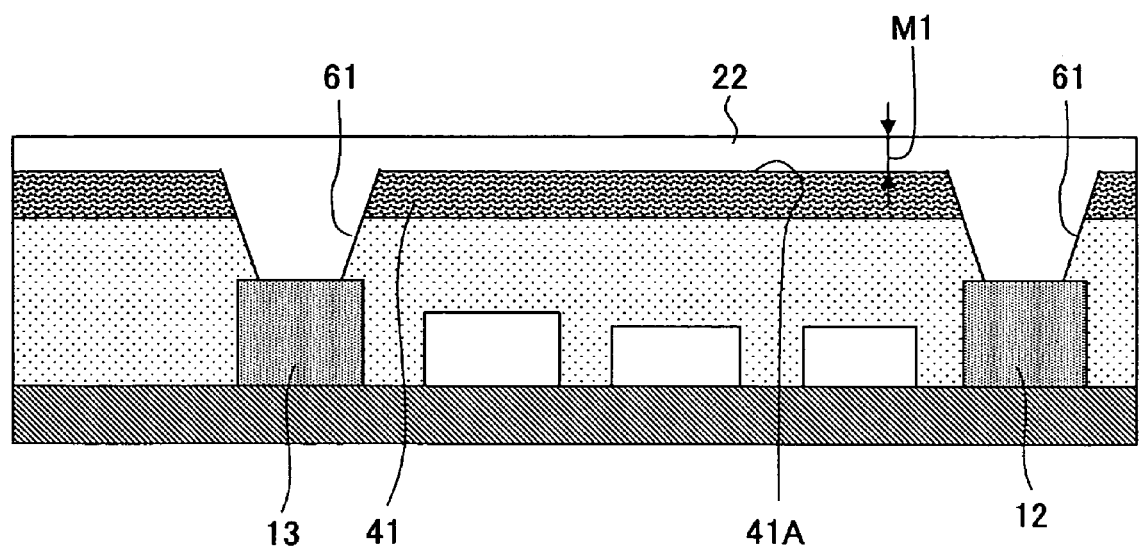
FIG. 26 is a diagram showing a third step of manufacturing a reader/writer according to the fourth embodiment.

Next, as shown in FIG. 26, the resin layer 22 for filling the opening portion 61 and covering the upper surface 41A of the soft magnetic resin layer 41 is formed (the step of forming the resin layer). The resin layer 22 is capable of roughening through a desmear process or the like.

Figure 27:
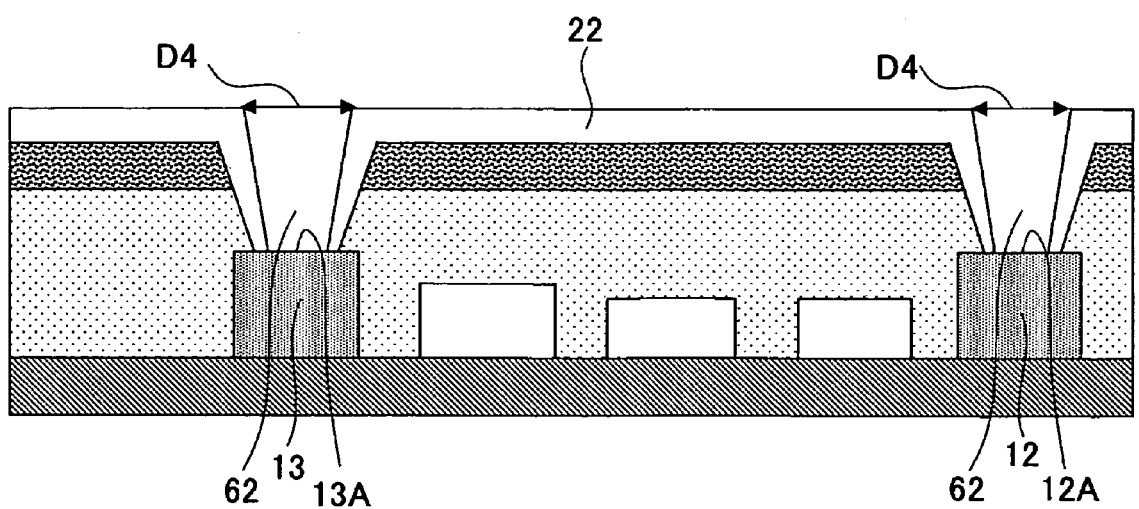
FIG. 27 is a diagram showing a fourth step of manufacturing a reader/writer according to the fourth embodiment.

Next, as shown in FIG. 27, opening portions 62 for exposing the upper surfaces 12A and 13A of the via connection terminals 12 and 13 are formed on the resin layer 22. Thereafter, the surface of the resin layer 22 is roughened through the desmear process. The opening portions 62 may be formed by laser processing, drill processing, or the like, for example. The diameter D4 of the upper end of the opening portion 62 may be 20 µm to 400 µm, for example.

Thereafter, by performing the same processing as in the steps shown in FIGS. 10 to 15 described in the first embodiment, the reader/writer 60 is manufactured.

By manufacturing the reader/writer 60 according to the present embodiment using the aforementioned method, the steps of forming the opening portions can be reduced to two steps (the opening portions 61 and 62) from three steps (the opening portions 21, 23, and 52) in the reader/writer 50 according to the second embodiment, thereby reducing the manufacturing cost of the reader/writer 60.

The reader/writers as described in the first to fourth embodiments can be applied to exchanging information with communication media of some kind such as IC cards besides IC tags.

According to the present invention, a reader/writer can be miniaturized and the present invention can be applied to a reader/writer capable of improving the reliability of communication with IC tags and IC cards and a manufacturing method thereof.

The present invention is not limited to the specifically disclosed embodiment, and variations and modifications may be made without departing from the scope of the present invention.

The present application is based on Japanese priority application No. 2005-119866 filed Apr. 18, 2005 the entire contents of which are hereby incorporated herein by reference.

What is claimed is:

1. A reader/writer comprising:
    a circuit board;
    a communication control portion mounted on the circuit board and configured to perform communication with IC tags;
    sealing resin for sealing the communication control portion; and
    an antenna electrically connected to the communication control portion through a via, wherein a resin layer is disposed on the sealing resin, the resin layer having a higher adhesiveness to a conductive film used as the antenna than that of the sealing resin, and the antenna is disposed on the resin layer, wherein the via penetrates the sealing resin and the resin layer,
    wherein other resin layer including resin containing soft magnetic metallic powder is disposed between the sealing resin and the resin layer.

2. The reader/writer according to claim 1, wherein the soft magnetic metallic powder is mixed with the resin as much as 10 wt % to 70 wt % relative to the resin.

3. The reader/writer according to claim 1, wherein the soft magnetic metallic powder includes at least one selected from a group consisting of Mn, Fe, Co, Ni, B, Si, Sr, Nb, Mo, Mg, Zn, and Pt.

4. The reader/writer according to claim 1,
    wherein an average particle size of the soft magnetic metallic powder is 1 µm to 8 µm.

5. The reader/writer according to claim 1, wherein the via extends into a depth of the sealing resin and is covered by the resin layer in the depth of the sealing resin.

6. A method for manufacturing a reader/writer including a communication control portion for communicating with IC tags, sealing resin for sealing the communication control portion, and an antenna electrically connected to the communication control portion mounted on a circuit board through a via, the method comprising the steps of:
    mounting the communication control portion on the circuit board;
    forming the sealing resin;
    forming a resin layer on the sealing resin, the resin layer having a higher adhesiveness to a conductive film used as the antenna than that of the sealing resin; and
    forming the antenna on the resin layer, wherein the via penetrates the sealing resin and the resin layer, and
    further including the step of forming other resin layer between the sealing resin forming step and the resin layer forming step, the other resin layer including resin containing soft magnetic metallic powder.

7. The method for manufacturing a reader/writer according to claim 6, wherein the via extends into a depth of the sealing resin and is covered by the resin layer in the depth of the sealing resin.

8. A reader/writer comprising:
    a circuit board;
    a communication control portion mounted on the circuit board and configured to perform communication with IC tags;
    sealing resin for sealing the communication control portion;
    an antenna electrically connected to the communication control portion;
    a first resin layer including resin containing soft magnetic metallic powder disposed on the sealing resin; and
    a second resin layer disposed in contact with the first resin layer and the sealing resin, the second resin layer having a higher adhesiveness to a conductive film used as the antenna than that of the sealing resin, and the antenna is disposed on the second resin layer.

* * * * *